(12) United States Patent
Simms (10) Patent No.: US 10,958,188 B1
(45) Date of Patent: Mar. 23, 2021

(54) BUS VOLTAGE LIMITER FOR CONVERTER APPARATUS WITH MULTIPLE DC BUSES

(71) Applicant: Eaton Intelligent Power Limited, Dublin (IE)

(72) Inventor: Stan Rex Simms, Arden, NC (US)

(73) Assignee: Eaton Intelligent Power Limited

( * ) Notice: Subject to any disclaimer, the term of this patent is extended or adjusted under 35 U.S.C. 154(b) by 0 days.

(21) Appl. No.: 16/582,021

(22) Filed: Sep. 25, 2019

(51) Int. Cl.
| | |
|---|---|
| *H02M 7/483* | (2007.01) |
| *H02M 1/32* | (2007.01) |
| *H02P 3/22* | (2006.01) |
| *G05F 1/613* | (2006.01) |

(52) U.S. Cl.
CPC ............ *H02M 7/483* (2013.01); *G05F 1/613* (2013.01); *H02M 1/32* (2013.01); *H02P 3/22* (2013.01)

(58) Field of Classification Search
CPC .... H02P 3/22; H02P 3/18; H02P 3/14; H02M 7/483; H02M 7/487; G05F 1/613
See application file for complete search history.

(56) References Cited

U.S. PATENT DOCUMENTS

| | | | |
|---|---|---|---|
| 5,687,049 A | 11/1997 | Mangtani | |
| 6,058,031 A | 5/2000 | Lyons et al. | |
| 6,377,478 B1 * | 4/2002 | Morishita | ............... H02P 23/06 |
| | | | 363/34 |
| 7,088,073 B2 | 8/2006 | Morishita | |
| 7,834,579 B2 | 11/2010 | Nojima | |
| 7,920,934 B2 | 4/2011 | Aruga | |
| 8,618,698 B2 | 12/2013 | Aiello et al. | |
| 9,184,673 B2 | 11/2015 | Mihalache | |
| 9,374,014 B2 | 6/2016 | Kjaer | |
| 2005/0224296 A1 * | 10/2005 | Smith | .................... B66B 1/308 |
| | | | 187/277 |

(Continued)

FOREIGN PATENT DOCUMENTS

| | | |
|---|---|---|
| CN | 106602912 | 4/2017 |
| EP | 3367552 | 8/2018 |
| WO | WO 2018/171782 | 9/2018 |

OTHER PUBLICATIONS

Rasin et al., *Regeneration in Variable Frequency Drives and Energy Saving Methods*, International Research Journal of Engineering and Technology (IRJET); vol. 04; Issue 03; Mar. 2017, pp. 1246-1249.

(Continued)

*Primary Examiner* — Harry R Behm
(74) *Attorney, Agent, or Firm* — Stanek Lemon Crouse & Meeks, P.A.

(57) ABSTRACT

An apparatus includes a first DC bus, a second DC bus, a first converter circuit coupled to the first DC bus, and a second converter circuit coupled to the second DC bus. The apparatus further includes a limiter circuit coupled to the second DC bus, a first control circuit configured to sense a voltage on the first DC bus and to responsively control the first converter circuit to limit the voltage on the first DC bus, and a second control circuit configured to sense a voltage on the second DC bus and to responsively control the limiter circuit to limit the voltage on the second DC bus. The apparatus may include a modulation conversion circuit configured to provide a set of switch control signals to the converter circuits and implemented in a module that is also used to implement the second control circuit.

17 Claims, 7 Drawing Sheets

(56) References Cited

U.S. PATENT DOCUMENTS

| | | | | |
|---|---|---|---|---|
| 2009/0008937 A1* | 1/2009 | Erdman | ............... | H02P 9/105 290/44 |
| 2009/0200969 A1* | 8/2009 | Nagataki | ............... | H02P 3/22 318/380 |
| 2012/0033472 A1* | 2/2012 | Oka | ............... | H02P 27/08 363/127 |
| 2018/0248493 A1 | 8/2018 | Mihalahe | | |
| 2018/0287482 A1 | 10/2018 | Schult et al. | | |

OTHER PUBLICATIONS

Colak et al., *Review of Multilevel Voltage Source Inverter Topologies and Control Schemes*, Energy Conversion and Management (2010); pp. 1-15.

Peng, et al.; *A Multilevel Voltage-Source Inverter with Separate DC Sources for Static Var Generation*; IEEE Transactions on Industry, Applications, vol. 32, No. 5; Sep./Oct. 1996; pp. 1130-1138.

\* cited by examiner

FIG. 8

BUS VOLTAGE LIMITER FOR CONVERTER APPARATUS WITH MULTIPLE DC BUSES

BACKGROUND

The inventive subject matter relates to electrical apparatus and methods and, more particularly, to protection apparatus for motor drives and similar power converter devices.

In some power converter applications, a converter circuit that provides power to load from a DC bus may feed power back to the DC bus, which may result in an undesirable increase in DC bus voltage. For example, in adjustable frequency drive (AFD) applications, deceleration or overhauling loads coupled to the AFD's output inverter may lead to such increased DC bus voltage.

In AFDs that use a single DC bus, such DC bus overvoltage may be limited by controlling the inverter output frequency. However, more complex AFDs may use separate DC buses for respective output phases of the AFD, which may introduce complexity into limiting DC bus voltage, as different ones of the buses may exhibit overvoltage at different times. Conventional techniques for addressing such issues are described, for example, in U.S. Pat. No. 7,088,073 to Morashita.

SUMMARY

Some embodiments of the inventive subject matter provide an apparatus including a first DC bus, a second DC bus, a first converter circuit coupled to the first DC bus, and a second converter circuit coupled to the second DC bus. The apparatus includes a limiter circuit coupled to the second DC bus, a first control circuit configured to sense a voltage on the first DC bus and to responsively control the first converter circuit to limit the voltage on the first DC bus. The apparatus further includes a second control circuit configured to sense a voltage on the second DC bus and to responsively control the limiter circuit to limit the voltage on the second DC bus.

The limiter circuit may include a first limiter circuit, and the apparatus may further include a third DC bus, a third converter circuit coupled to the third DC bus, and a second limiter circuit coupled to the third DC bus. The second control circuit may be configured to sense a voltage on the third DC bus and to responsively control the second limiter circuit to limit the voltage on the third DC bus.

In some embodiments, the first, second and third converter circuits may include respective first, second and third multilevel converter circuits configured to be coupled to respective first, second and third phases of a motor. The apparatus may further include a two-level converter control circuit configured to produce a first set of switch control signals and a modulation conversion circuit configured to receive the first set of switch control signals and responsively provide a second set of switch control signals derived from the first set of switch control signals to the first, second and third multilevel converter circuits. The modulation conversion circuit may include first and second modules coupled to the two-level converter control circuit. The first control circuit may be implemented using the two-level converter control circuit and the first module and the second control circuit may be implemented using the second module. In some embodiments, the first and second modules are identical may each include at least two sense inputs and at least two control outputs. A first sense input of the second module may receive a voltage sense signal for the second DC bus, a second sense input of the second module may receive a voltage sense signal for the third DC bus, a first control output of the second module may transmit a control signal to the first limiter circuit, and a second control output of the second module may transmit a control signal to the second limiter circuit.

Further embodiments provide an apparatus including first, second and third DC buses and respective first, second and third multilevel converter circuits coupled to respective ones of the first, second and third DC buses and configured to be coupled to respective first, second and third motor phases. The apparatus further includes first and second limiter circuits coupled to respective ones of the first and second DC buses, a two-level converter control circuit configured to produce a first set of switch control signals, and first and second modules configured to receive the first set of switch control signals and to responsively provide a second set of switch control signals derived from the first set of switch control signals to the first, second and third converter circuits. The two-level converter control circuit is configured to sense a voltage on the first DC bus via the first module and to responsively control the first converter circuit to limit the voltage on the first DC bus. The second module is configured to sense a voltage on the second DC bus and a voltage on the third bus and to responsively control the first and second limiter circuits, respectively, to limit the voltage on the second DC bus and the voltage on the third DC bus.

Still further embodiments provide methods of operating an apparatus including a first DC bus, a second DC bus, a first converter circuit coupled to the first DC bus and configured to be coupled to a first phase of a load/source and a second converter circuit coupled to the second DC bus and configured to be coupled to a second phase of the load/source. The methods include sensing a voltage on the first DC bus and responsively controlling the first converter circuit to limit the voltage on the first DC bus and sensing a voltage on the second DC bus and responsively controlling a limiter circuit coupled to the second bus to limit the voltage on the second DC bus.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 1:
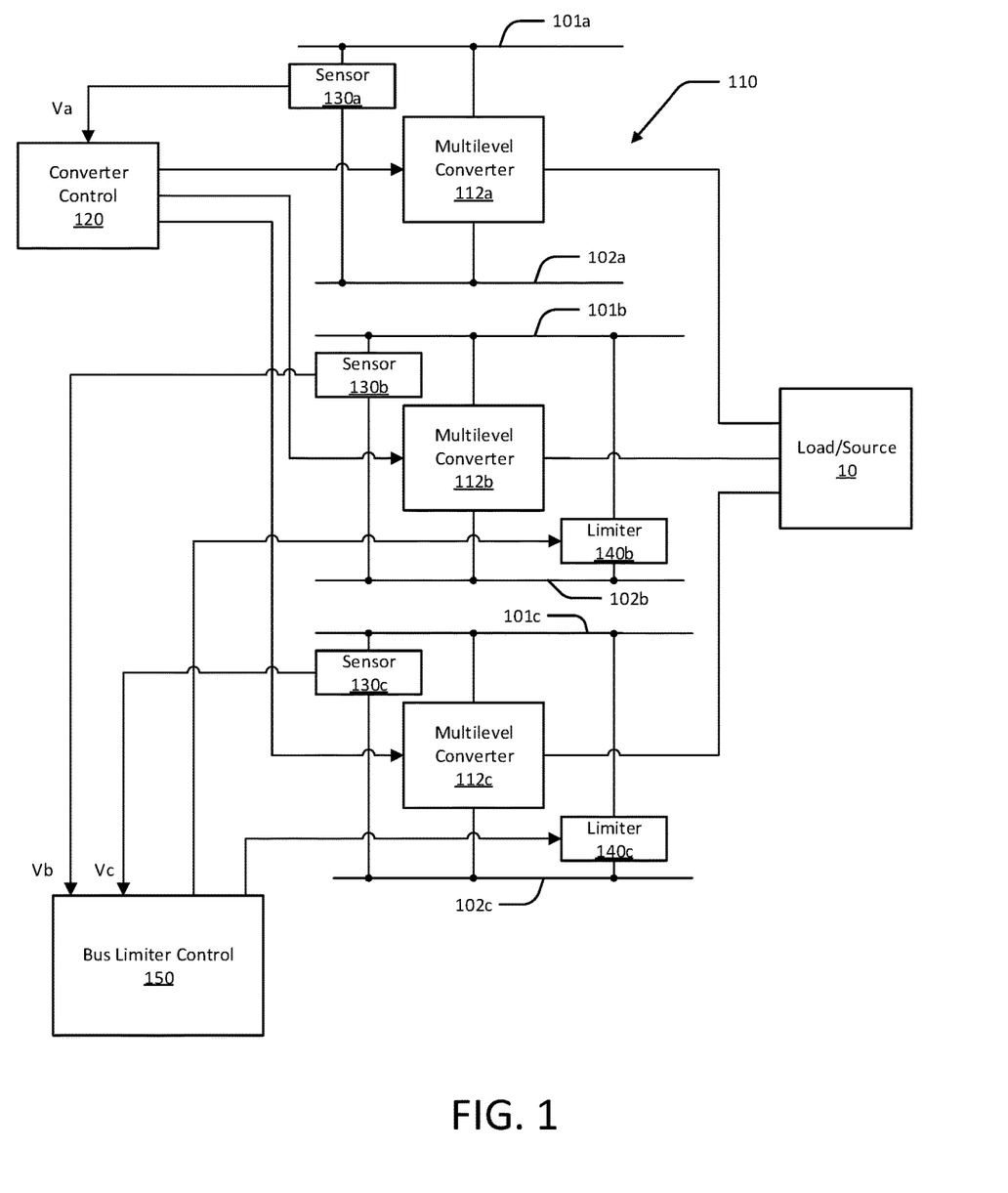
FIG. 1 is a schematic diagram illustrating a bus voltage control apparatus according to some embodiments of the inventive subject matter.

FIG. 1 is a schematic diagram illustrating an apparatus according to some embodiments of the inventive subject matter. The apparatus includes a converter circuit 110 including multiple multilevel converter circuits 112a, 112b, 112c that are coupled to respective phases of a load/source 10. The first multilevel converter circuit 112a is coupled to first and second DC buses 101a, 102a. The second multilevel converter circuit 112b is coupled to first and second DC buses 101b, 102b. The third multilevel converter circuit 112c is coupled to first and second DC buses 101c, 102c. The multilevel converter circuits 112a, 112b, 112c may comprise, for example, respective multilevel bridge circuits, such as respective 3, 5 or higher level neutral-point-clamped (NPC) or other multilevel bridge circuits. In some embodiments described below, for example, the multilevel converter circuits 112a, 112b, 112c may be respective 5-level H-bridge NPC converter circuits. The multilevel converter circuits 112a, 112b, 112c are controlled by a converter control circuit 120, which may provide gate drive or similar switch control signals for driving transistors or other semiconductor switches of the multilevel converter circuits 112a, 112b, 112c.

Generally, the multilevel converter circuits 112a, 112b, 112c may include power semiconductor switching devices, such as insulated gate bipolar transistors (IGBTs), power MOSFETs, or other such devices, arranged in bridge or other circuit configurations. The converter control circuit 120 generally may include analog and/or digital circuitry, such as a microprocessor, microcontroller or similar computing device, along with memory and peripheral circuitry that interfaces such devices to the multilevel converter circuits 112a, 112b, 112c and other components of the apparatus. Such peripheral circuitry may include, for example, communications interface circuitry (e.g., fiber optic or other communications circuitry), signal processing circuitry (e.g., filters and signal conversion circuits), and the like.

As further illustrated, the apparatus may include first, second and third voltage sensors 130a, 130b, 130c (e.g., respective voltage divider circuits and interface circuitry associated therewith), which are configured to sense respective voltages Va, Vb, Vc of respective ones of the DC bus pairs 101a/102a, 101b/102b, 101c/102c. The first voltage sensor 130a may provide a sense signal representative of the phase "A" voltage Va to the converter control circuit 120, which may responsively regulate the bus voltage Va to limit overvoltage conditions that may occur on the "A" phase DC bus. For example, the converter control circuit 120 may implement a vector controller that can be used to vary the output frequency of the first multilevel converter circuit 112a to regulate the "A" DC bus voltage Va.

The "B" and "C" DC bus voltages Vb, Vc may be limited using respective limiter circuits 140b, 140c. The limiter circuit 140b, 140c may be, for example, energy dissipation circuits that act to limit the DC bus voltage Vb, Vc by dissipating energy in a resistive element. However, it will be appreciated that other types of voltage limiter circuits may be used, such as circuits that transfer energy to storage devices, such as batteries and/or capacitors (e.g., in a regeneration scheme). Respective ones of the second and third voltage sensors 130b, 130c may provide voltage sense signals representative of the DC bus voltages Vb, Vc to a bus limiter control circuit 150, which may responsively operate (e.g., selectively enable/disable) the respective limiter circuits 140b, 140c to limit the second and third bus voltages Vb, Vc. In some embodiments discussed in further detail below, a similar bus voltage limiter circuit may be provided for the first buses 101a, 102a.

Figure 2:
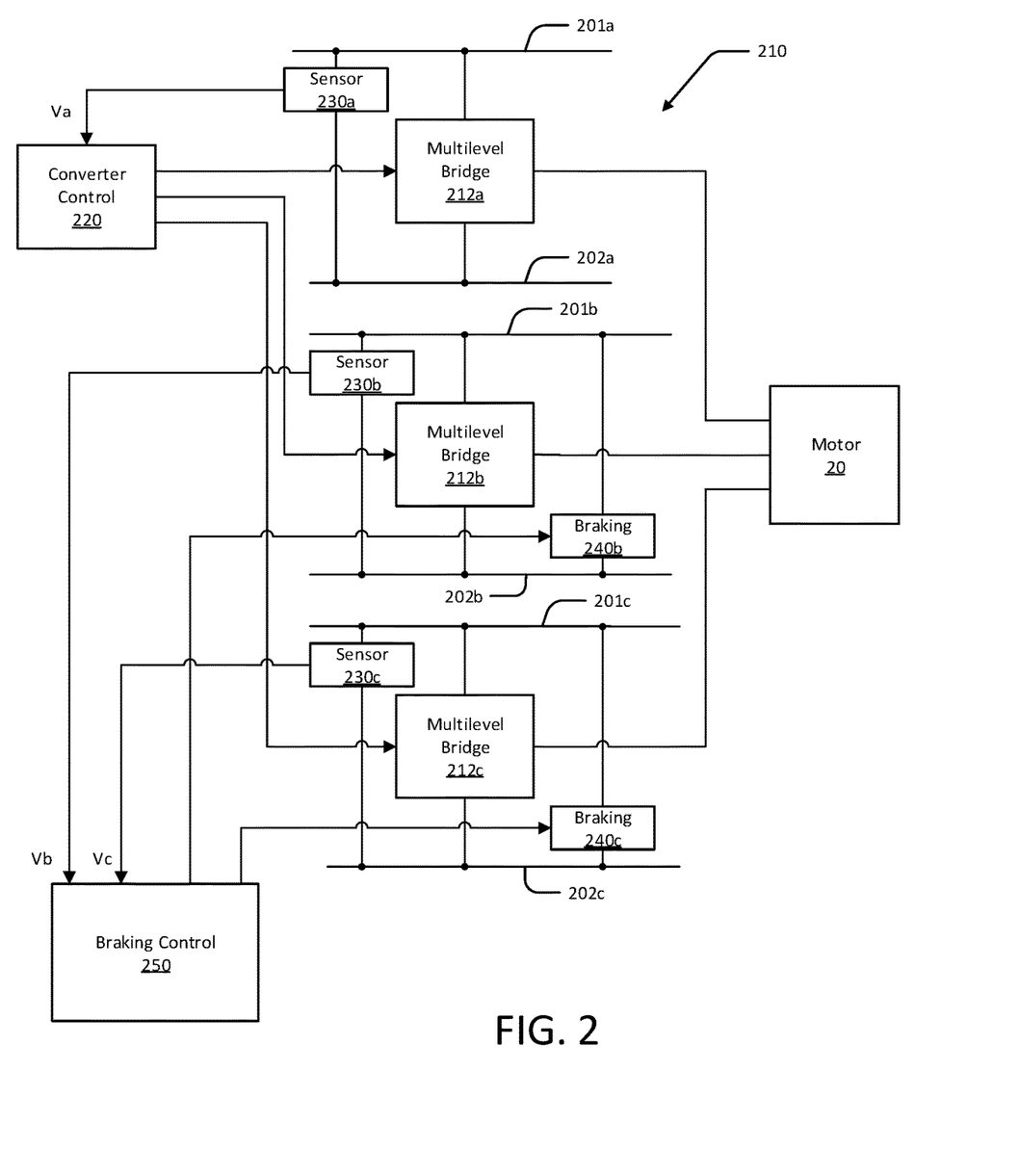
FIG. 2 is a schematic diagram illustrating a bus voltage control apparatus for a motor drive application according to some embodiments of the inventive subject matter.

FIG. 2 illustrates an apparatus for motor drive applications according to further embodiments. The apparatus includes a converter circuit 210 including multilevel bridge circuits 212a, 212b, 212c that are coupled to respective phases of a motor 20 and to respective DC bus pairs 201a/202a, 201b/202b, 201c/202c. The multilevel bridge circuits 212a, 212b, 212c are controlled by a converter control circuit 220, which may provide gate drive signals for driving transistors of the multilevel bridge circuits 212a, 212b, 212c. The components may be included, for example, in an adjustable frequency drive (AFD), which may include additional components, such as respective diode rectifiers (not shown) that couple an AC power source to the respective DC bus pairs 201a/202a, 201b/202b, 201c/202c.

As further illustrated, the apparatus may include first, second and third voltage sensors 230a, 230b, 230c, which are configured to sense respective voltages Va, Vb, Vc of respective ones of the DC bus pairs 201a/202a, 201b/202b, 201c/202c. The first voltage sensor 230a may provide a sense signal representative of the phase "A" voltage Va to the converter control circuit 220, which may responsively regulate the bus voltage Va to limit overvoltage conditions that may occur in response to power feedback through the converter circuit 210, such as may occur in response to deceleration of the motor and/or load overhauling. For example, the converter control circuit 220 may implement a vector controller that acts responsive to the feedback of the "A" phase DC bus voltage Va.

The "B" and "C" DC voltages Vb, Vc may be limited using respective resistive braking circuits 240b, 240c that act to limit the DC bus voltage Vb, Vc by dissipating energy in a resistive element. Respective ones of the second and third voltage sensors 230b, 230c may provide voltage sense signals representative of the DC bus voltages Vb, Vc to a braking control circuit 250, which may responsively operate (e.g., selectively enable/disable) the respective braking circuits 240b, 240c to limit the second and third bus voltages Vb, Vc.

Figure 3:
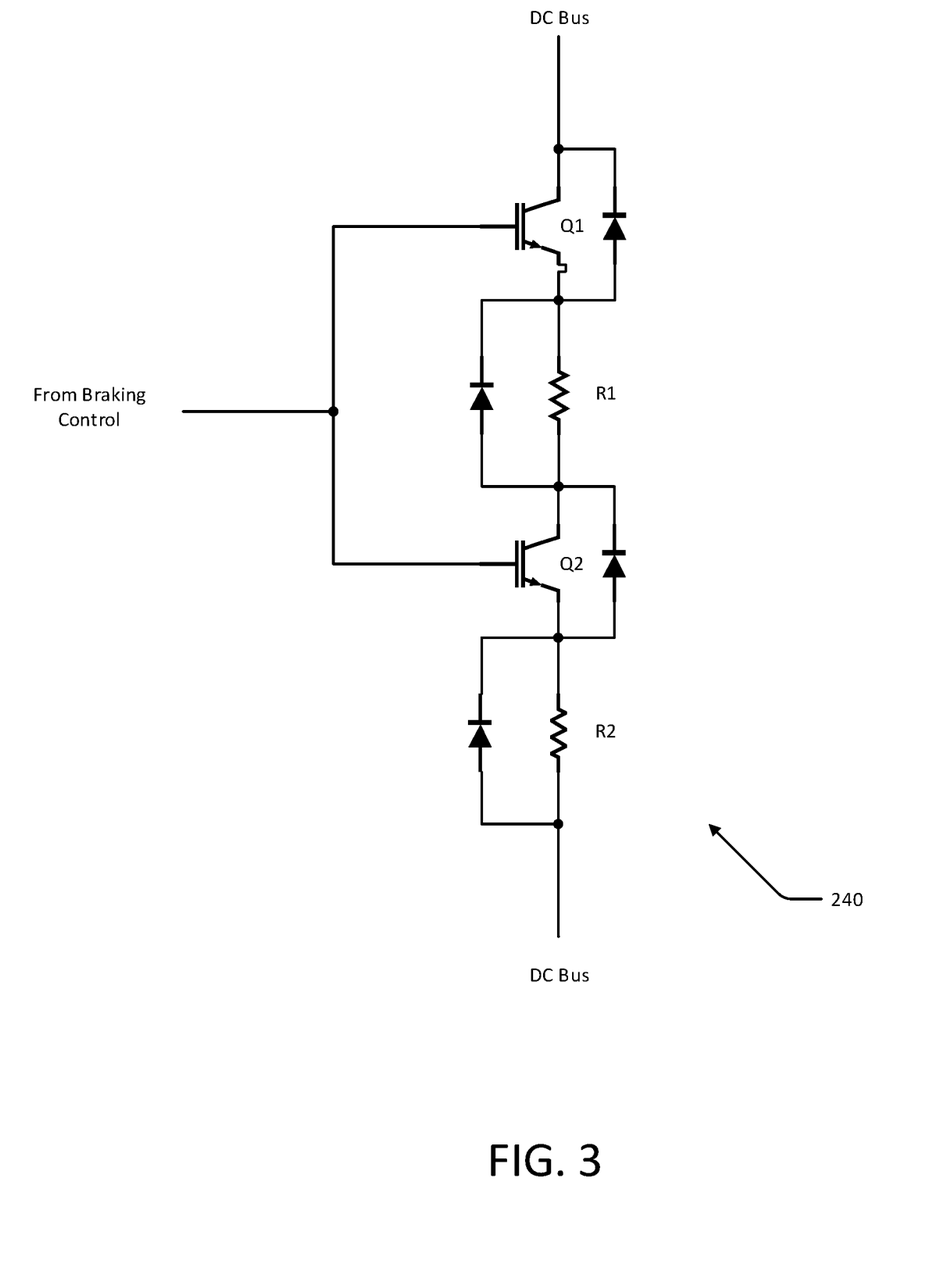
FIG. 3 is a schematic diagram illustrating a braking circuit for the apparatus of FIG. 2.

FIG. 3 illustrates an example of such a braking circuit 240. The braking circuit 240 includes resistors R1, R2 and transistors Q1, Q2 selectively connect the resistors R1,R2 to DC buses responsive to a control signal, e.g., a signal provided by the braking control circuit 250. It will be appreciated that this is provide as an example for purposes of illustration, and that some embodiments may use different braking circuit arrangements.

According to further embodiments, arrangements along the lines described above may be advantageously used in AFD applications that use modular architectures to support a variety of different AFD configurations. In particular, U.S. Pat. No. 7,834,579 to Nojima, the disclosure of which is incorporated herein by reference, describes apparatus in which an off-the-shelf two-level inverter controller can be used to multilevel (e.g., three-level or greater) converters in an AFD or other apparatus using modulation conversion circuits that translate two-level bridge switch vectors generated by the controller to higher order switch vectors that can drive the higher order converter circuits. The modulation conversion circuits may be modular such that, for example, a single modulation conversion module may be used to drive 3-level converters, two modulation conversion modules may be used to drive 5-level converters, and so on.

Some embodiments of the inventive subject matter stem from a realization that overvoltage control can be problematic in AFDs and similar apparatus that use separate DC buses while also using a two-level inverter control as described above. In some embodiments, an AFD of similar apparatus may use ancillary voltage limiting circuitry along the lines described above with respect to FIGS. 1-3.

Figure 4:
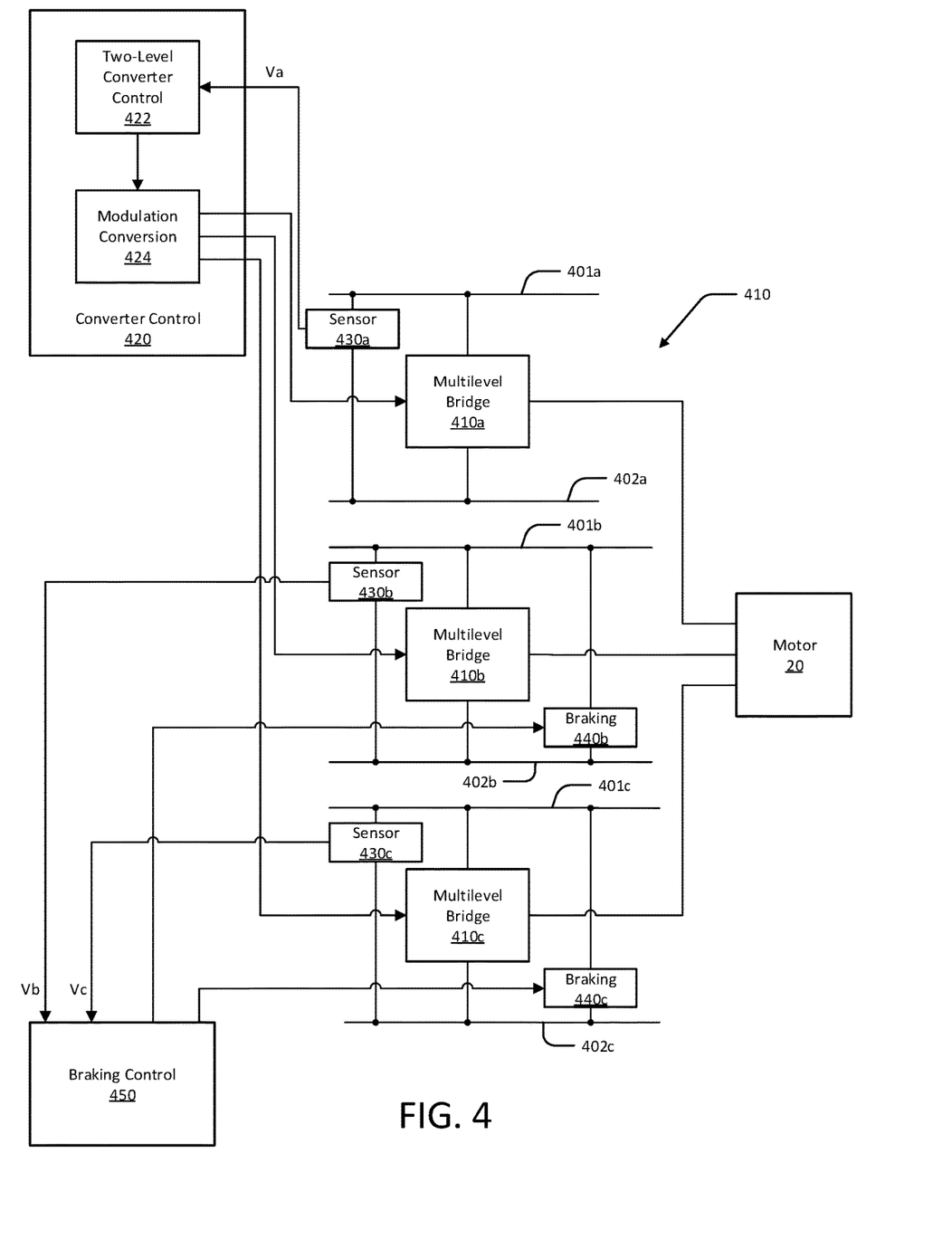
FIG. 4 is a schematic diagram illustrating a bus voltage control apparatus using two-level to multi-level modulation conversion according to some embodiments of the inventive subject matter.

FIG. 4 illustrates portions of a motor drive apparatus according to further embodiments. The apparatus includes a converter circuit 410 including multiple multilevel bridge circuits 410a, 410b, 410c that are coupled to respective phases of a motor 20 and to respective DC bus pairs 401a/402a, 401b/402b, 401c/402c. The multilevel bridge circuits 410a, 410b, 410c are controlled by a converter control circuit 420, which may provide gate drive signals for driving transistors of the multilevel bridge circuits 410a, 410b, 410c. In particular, the converter control circuit 420 may include a two-level converter control circuit 422, which may be configured to generate a first set of switch control signals suitable for modulation of a two-level converter. The converter control circuit 420 may further include a modulation conversion circuit 424, which is configured to generate a second, larger set of switch control signals from the set of switch control signals produced by the two-level converter control circuit 422. The multilevel bridge circuits 410a, 410b, 410c are driven responsive to the second set of switch control signals, along lines similar to those described in the aforementioned U.S. Pat. No. 7,834,579.

As further illustrated, the apparatus may include first, second and third voltage sensors 430a, 430b, 430c (e.g., voltage divider circuits), which are configured to sense respective voltages Va, Vb, Vc of respective ones of the DC bus pairs 401a/402a, 401b/402b, 401c/402c. The first voltage sensor 430a may provide a sense signal representative of the phase "A" voltage Va to the converter control circuit 420, which may responsively regulate the bus voltage Va to limit overvoltage conditions that may occur in response to power feedback through the converter circuit 410 (e.g., due to motor deceleration or load overhauling). For example, the converter control circuit 420 may implement a vector controller that acts responsive to the feedback of the "A" phase DC bus voltage Va.

The "B" and "C" voltages Vb, Vc may be limited using respective resistive braking circuits 440b, 440c that act to limit the DC bus voltage Vb, Vc by dissipating energy in a resistive element. Respective ones of the second and third voltage sensors 430b, 430c may provide voltage sense signals representative of the DC bus voltages Vb. Vc to a braking control circuit 450, which may responsively operate (e.g., selectively enable/disable) the respective braking circuits 440b, 440c to limit the second and third bus voltages Vb. Vc. The braking circuits 440b, 440c may, for example, have the structure illustrated in FIG. 3.

Figure 5:
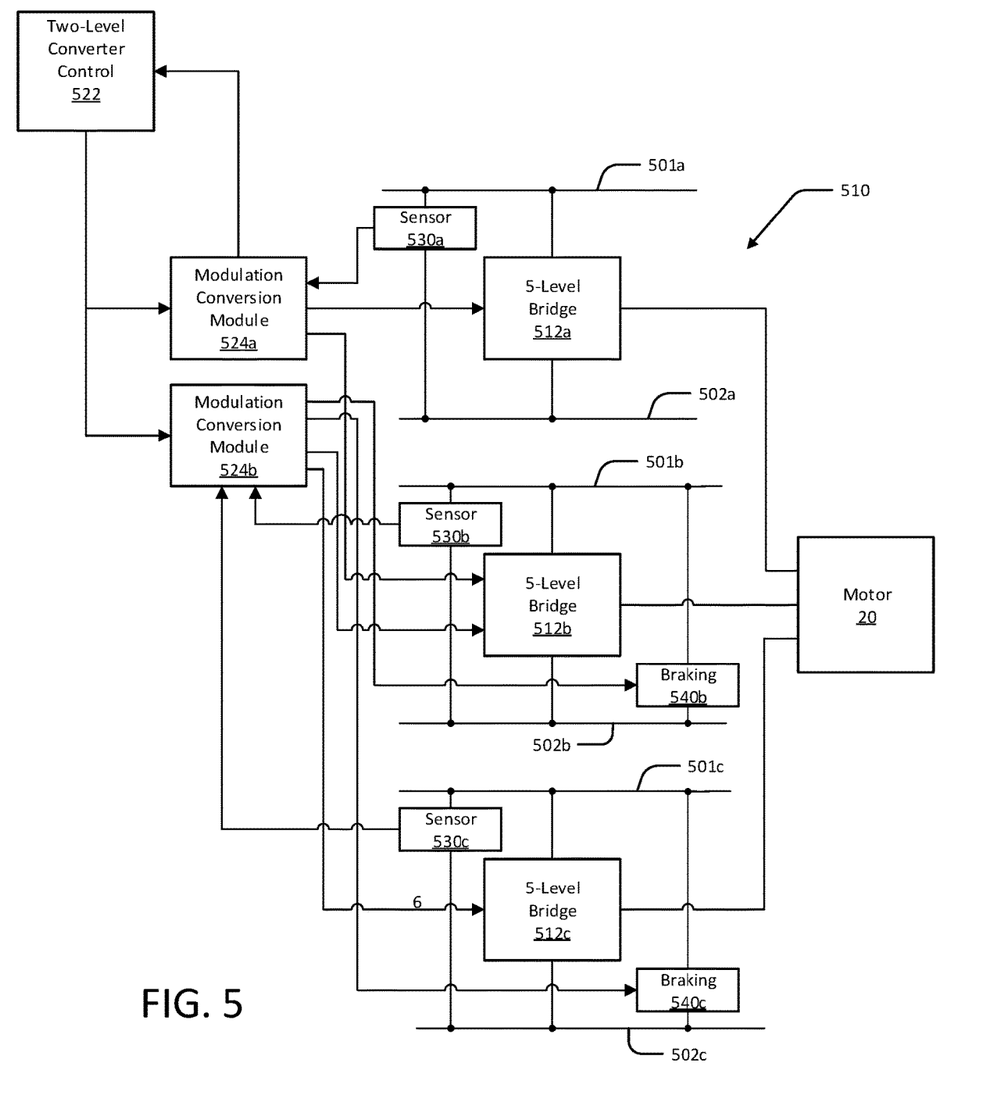
FIG. 5 is a schematic diagram illustrating a bus voltage control apparatus using multi-level modulation conversion modules according to some embodiments of the inventive subject matter.

FIG. 5 illustrates a motor drive apparatus according to still further embodiments, in which modulation conversion and braking circuit control functions may be combined in one or more modulation conversion modules. The apparatus includes a converter circuit 510 including multiple 5-level bridge circuits 512a. 512b, 512c (e.g., 5-level H-bridge circuits) that are coupled to respective phases of a motor 20 and to respective first, second and third DC bus pairs 501a/502a, 501b/502b, 501c/502c. The 5-level bridge circuits 512a, 512b, 512c are controlled by a two-level converter control module 522, which provides a first set of switch control signals (e.g., a set of 6 signals for driving three two-level bridge circuits) to first and second modulation conversion modules 524a, 524b. The two-level converter control module 522 and the first and second modulation conversion modules 524a, 524b may be, for example, respective cards or similar form factor assemblies that are configured for insertion into a rack or similar structure of a motor drive apparatus.

The first modulation conversion module 524a is configured to provide a second set of switch control signals (e.g., a set of 12 switch control signals) to the first 5-level bridge circuit 512a and the second 5-level bridge circuit 512b responsive to the 2-level switch control signals received from the two-level converter control module 522. The second modulation conversion module 524b is configured to generate a third set of switch control signals (e.g., a second set of 12 switch control signals) for the second and third 5-level bridge circuits 512b, 512c responsive to the switch control signals generated by the two-level converter control module 522. The switch control signals provided by the first and second modulation conversion modules 524a, 524b may be, for example, optical signals transmitted over respective fiber optic channels that link the first and second modulation conversion modules 524a, 524b to the first, second and third 5-level bridge circuits 512a, 512b, 512c, which may include fiber optic communications interface circuitry that receives these optical signals and processes them into corresponding gate drive or similar semiconductor switching device control signals.

As further illustrated, the apparatus may include first, second and third voltage sensors 530a, 530b, 530c (e.g., voltage divider circuits), which are configured to sense respective voltages Va, Vb, Vc of respective ones of the first, second and third DC bus pairs 501a/502a, 501b/502b, 501c/502c. The first voltage sensor 530a may provide a sense signal representative of the phase "A" voltage Va to the two-level converter control module 522 via the first modulation conversion module 524. The two-level converter control module 522 may responsively regulate the bus voltage Va to limit overvoltage conditions that may occur in response to power feedback through the converter circuit 510 (e.g., due to motor deceleration or load overhauling). For example, the converter control circuit 520 may implement a vector controller that acts responsive to the feedback of the "A" phase DC bus voltage Va.

The "B" and "C" DC voltages Vb, Vc may be limited using respective resistive braking circuits 540*b*, 540*c* that act to limit the DC bus voltage Vb, Vc by dissipating energy in a resistive element. Respective ones of the second and third voltage sensors 530*b*, 530*c* may provide voltage sense signals representative of the DC bus voltages Vb, Vc to the second modulation conversion module 524*b*, which may include control circuitry that responsively operates (e.g., selectively enable/disable) the respective braking circuits 540*b*, 540*c* to limit the second and third bus voltages Vb, Vc.

Figure 6:
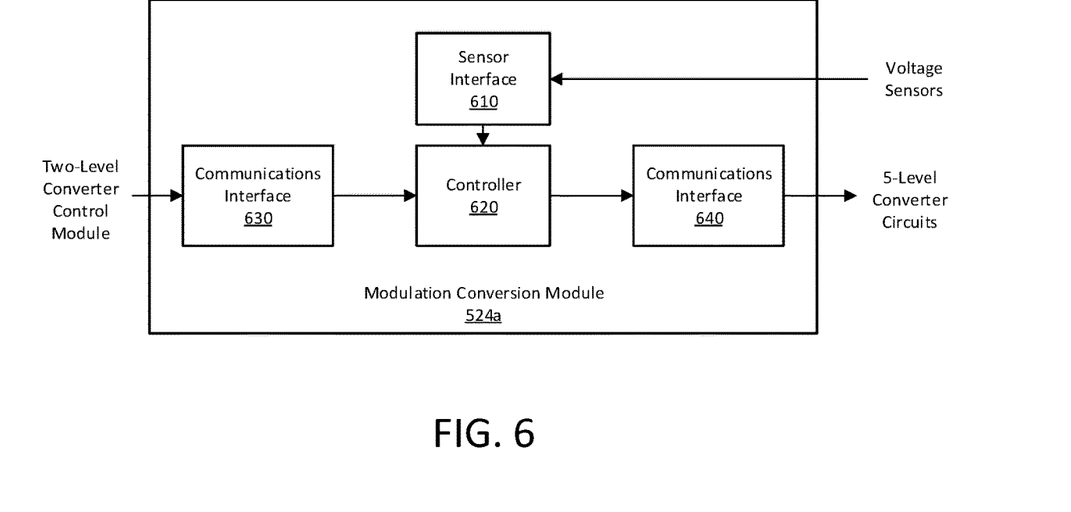
FIGS. 6 and 7 are schematic diagrams illustrating modulation conversion modules for the apparatus of FIG. 5.
Figure 7:
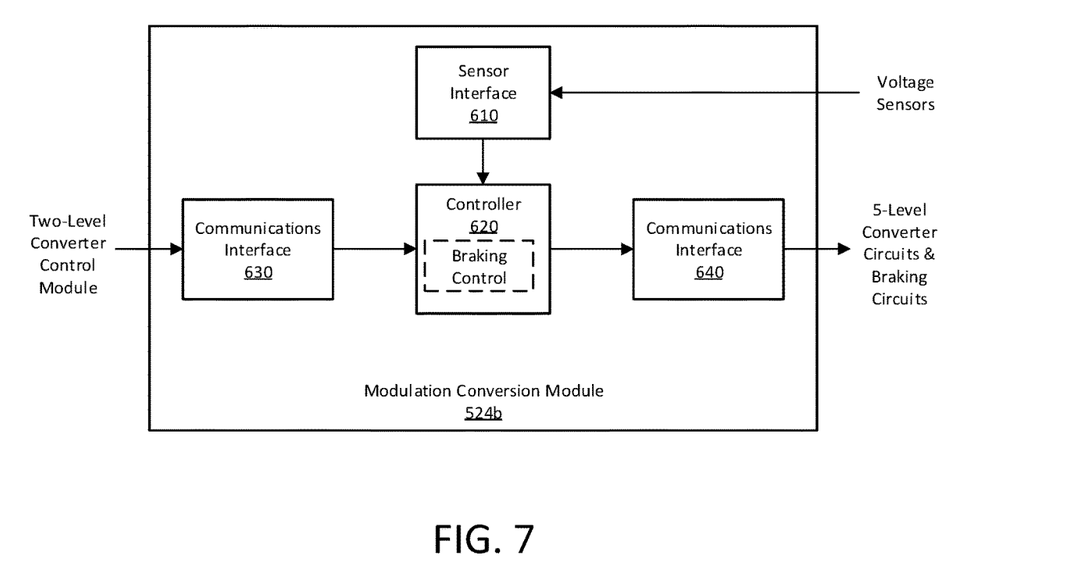

FIGS. 6 and 7 illustrate examples of structures for the first and second modulation conversion modules 524*a*, 524*b*. Each of the modulation conversion modules 524*a*, 524*b* may include a first communications interface circuit 630, which is configured to receive two-level converter switch control signals from the two-level converter control module 522. These signals may, for example, be signals multiplexed on a high-speed serial fiber optic communications channel. The received signals are provided to a controller 620, which may include, for example, a microcontroller or similar computing device. A second communications interface circuit 640 is configured to provide 5-level switch control signals generated by the controller 620 to the first and second 5-level converter circuits via a plurality of communications channels, which may be respective fiber optic channels. The controller 620 may also generate auxiliary control signals for transmission via the second communications interface circuit 640. As shown in FIG. 7, in the second modulation conversion module 524*b*, these auxiliary control signal channels may be used to provide control signals to the braking circuits 540*b*, 540*c*, with the controller 620 providing the braking control signals responsive to voltage sense signal inputs from the sensors 530*b*, 530*c*.

Figure 8:
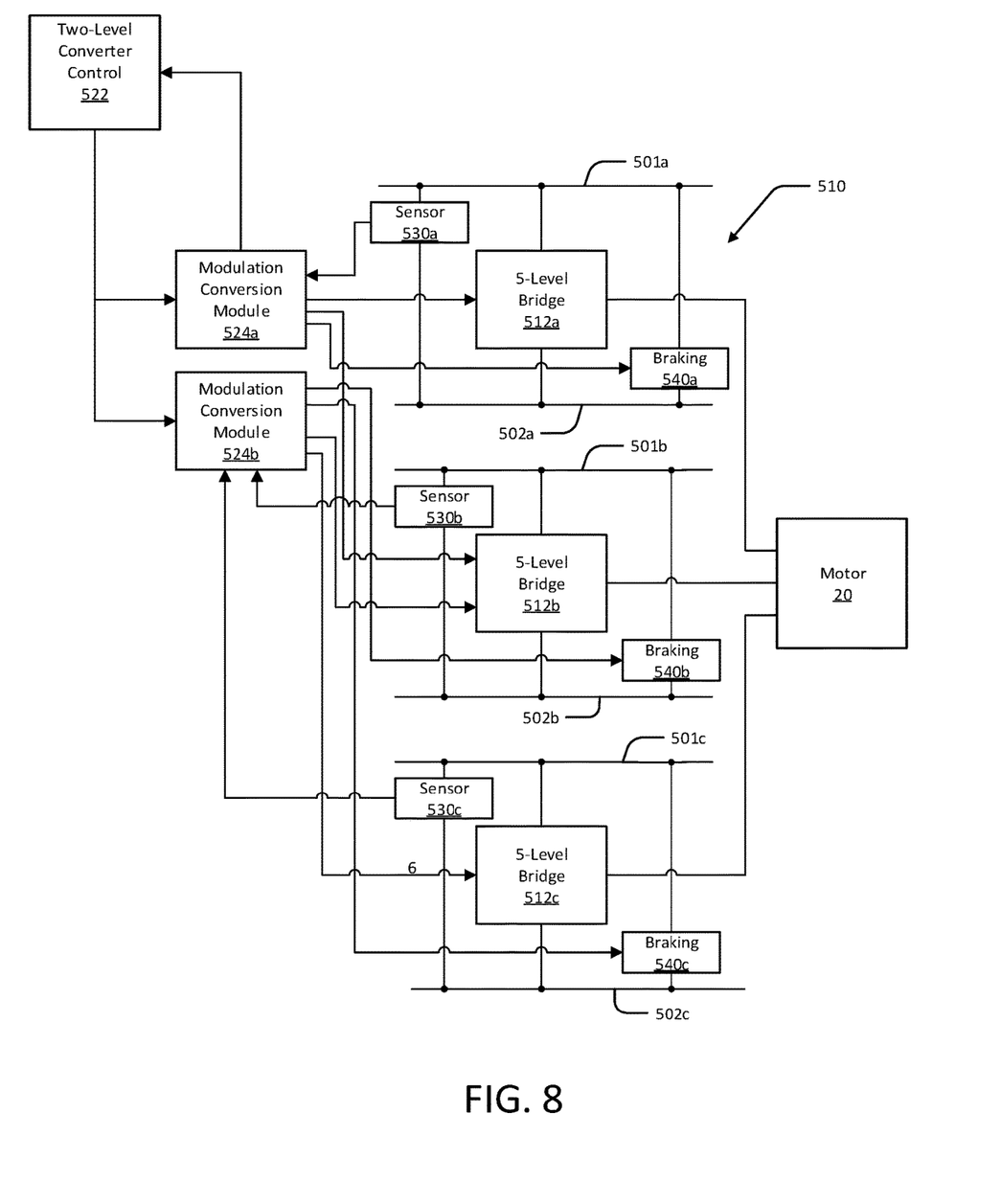
FIG. 8 is a schematic diagram illustrating a bus voltage control apparatus using multi-level modulation conversion modules according to further embodiments of the inventive subject matter.

Referring to FIG. 8, a braking circuit 540*a* may also be provided for the "A" phase DC bus pair 501*a*, 502*a*. The braking circuit 540*a* may be controlled by the controller (e.g., the controller 620 of FIG. 6) of the first modulation conversion module 524*a* in manner similar to that described above with reference to the braking circuits S40*b*, 540*c* for the "B" and "C" phases.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
 a first DC bus;
 a second DC bus;
 a first multilevel converter circuit coupled to the first DC bus;
 a second multilevel converter circuit coupled to the second DC bus;
 a limiter circuit coupled to the second DC bus;
 a two-level converter control circuit configured to sense a voltage on the first DC bus and to responsively produce a first set of switch control signals;
 a modulation conversion circuit configured to receive the first set of switch control signals and responsively provide a second set of switch control signals derived from the first set of switch control signals to the first and second multilevel converter circuits; and
 a bus limiter control circuit configured to sense a voltage on the second DC bus and to responsively control the limiter circuit to limit the voltage on the second DC bus.

2. The apparatus of claim 1, wherein the first and second converter circuits are coupled to respective phases of an AC motor.

3. The apparatus of claim 1, wherein the limiter circuit comprises a resistive braking circuit.

4. An apparatus comprising:
 a first DC bus;
 a second DC bus;
 a third DC bus;
 a first converter circuit coupled to the first DC bus;
 a second converter circuit coupled to the second DC bus;
 a third converter circuit coupled to the third DC bus;
 a first limiter circuit coupled to the second DC bus;
 a second limiter circuit coupled to the third DC bus;
 a first control circuit configured to sense a voltage on the first DC bus and to responsively control the first converter circuit to limit the voltage on the first DC bus;
 a second control circuit configured to sense a voltage on the second DC bus and to responsively control the first limiter circuit to limit the voltage on the second DC bus and to sense a voltage on the third DC bus and to responsively control the second limiter circuit to limit the voltage on the third DC bus,
 wherein the first, second and third converter circuits comprise respective first, second and third multilevel converter circuits of at least three levels and configured to be coupled to respective first, second and third phases of a motor, and wherein the apparatus further comprises:
 a two-level converter control circuit configured to produce a first set of switch control signals; and
 a modulation conversion circuit configured to receive the first set of switch control signals and responsively provide a second set of switch control signals derived from the first set of switch control signals to the first, second and third multilevel converter circuits.

5. The apparatus of claim 4, wherein the modulation conversion circuit comprises first and second modules coupled to the two-level converter control circuit, wherein the first control circuit is implemented using the two-level converter control circuit and the first module, and wherein the second control circuit is implemented using the second module.

6. The apparatus of claim 5, wherein the first and second modules are identical, wherein each of the first and second modules comprises at least two sense inputs and at least two control outputs, wherein a sense input of the first module receives a voltage sensor signal for the first DC bus, wherein a first sense input of the second module receives a voltage sense signal for the second DC bus, wherein a second sense input of the second module receives a voltage sense signal for the third DC bus, wherein a first control output of the second module transmits a control signal to the first limiter circuit, and wherein a second control output of the second module transmits a control signal to the second limiter circuit.

7. The apparatus of claim 5, further comprising a third limiter circuit coupled to the first DC bus, wherein the second control circuit is configured sense the voltage on the first DC bus and to responsively control the third limiter circuit to limit the voltage on the first DC bus, and wherein the second control circuit is implemented using the first module.

8. The apparatus of claim 7, wherein the first and second modules are identical, wherein each of the first and second modules comprises at least two sense inputs and at least two control outputs, wherein a sense input of the first module receives a voltage sense signal for the first DC bus, wherein a first sense input of the second module receives a voltage sense signal for the second DC bus, wherein a second sense input of the second module receives a voltage sense signal for the third DC bus, wherein a control output of the first module transmits a control signal to the third limiter circuit, wherein a first control output of the second module transmits a control signal to the first limiter circuit and wherein a second control output of the second module transmits a control circuit to the second limiter circuit.

9. An apparatus comprising:
first, second and third DC buses;
respective first, second and third multilevel converter circuits coupled to respective ones of the first, second and third DC buses and configured to be coupled to respective first, second and third motor phases;
first and second limiter circuits coupled to respective ones of the first and second DC buses;
a two-level converter control circuit configured to produce a first set of switch control signals;
first and second modules configured to receive the first set of switch control signals and to responsively provide a second set of switch control signals derived from the first set of switch control signals to the first, second and third converter circuits,
wherein the two-level converter control circuit is configured to sense a voltage on the first DC bus via the first module and to responsively control the first converter circuit to limit the voltage on the first DC bus; and
wherein the second module is configured to sense a voltage on the second DC bus and a voltage on the third bus and to responsively control the first and second limiter circuits, respectively, to limit the voltage on the second DC bus and the voltage on the third DC bus.

10. The apparatus of claim 9, wherein the first and second modules are identical, wherein each of the first and second modules comprises at least two sense inputs and at least two control outputs, wherein a sense input of the first module receives a voltage sensor signal for the first DC bus, wherein a first sense input of the second module receives a voltage sense signal for the second DC bus, wherein a second sense input of the second module receives a voltage sense signal for the third DC bus, wherein a first control output of the second module transmits a control signal to the first limiter circuit, and wherein a second control output of the second module transmits a control signal to the second limiter circuit.

11. The apparatus of claim 9, further comprising a third limiter circuit coupled to the first DC bus, wherein the second control circuit is configured sense the voltage on the first DC bus and to responsively control the third limiter circuit to limit the voltage on the first DC bus, and wherein the second control circuit is implemented using the first module.

12. The apparatus of claim 11, wherein the first and second modules are identical, wherein each of the first and second modules comprises at least two sense inputs and at least two control outputs, wherein a sense input of the first module receives a voltage sense signal for the first DC bus, wherein a first sense input of the second module receives a voltage sense signal for the second DC bus, wherein a second sense input of the second module receives a voltage sense signal for the third DC bus, wherein a control output of the first module transmits a control signal to the third limiter circuit, wherein a first control output of the second module transmits a control signal to the first limiter circuit and wherein a second control output of the second module transmits a control circuit to the second limiter circuit.

13. The apparatus of claim 9, wherein the limiter circuit comprises a resistive braking circuit.

14. A method of operating an apparatus including a first DC bus, a second DC bus, a first multilevel converter circuit of at least three levels coupled to the first DC bus and configured to be coupled to a first phase of a load/source and a second multilevel converter circuit of at least three levels coupled to the second DC bus and configured to be coupled to a second phase of the load/source, the method comprising:
sensing a voltage on the first DC bus and responsively controlling the first converter circuit to limit the voltage on the first DC bus, wherein controlling the first converter circuit comprises generating a first set of switch control signals configured for two-level converter control, generating a second set of switch control signals from the first set of switch control signals and applying the second set of switch control signals to the first and second multilevel converter circuits; and
sensing a voltage on the second DC bus and responsively controlling a limiter circuit coupled to the second bus to limit the voltage on the second DC bus.

15. The method of claim 14, wherein generating a second set of switch control signals from the first set of switch control signals and applying the second set of switch control signals to the first and second multilevel converter circuits comprises generating the second set of switch control signals using first and second modules coupled to a two-level converter control circuit that generates the first set of switch control signals, wherein sensing a voltage on the first DC bus and responsively controlling the first converter circuit to limit the voltage on the first DC bus comprises sensing the voltage on the first DC bus and responsively controlling the first converter circuit to limit the voltage on the first DC bus using the first module, and wherein sensing a voltage on the second DC bus and responsively controlling a limiter circuit coupled to the second bus to limit the voltage on the second DC bus comprises sensing the voltage on the second DC bus and responsively controlling the limiter circuit to limit the voltage on the second DC bus using the second module.

16. The method of claim 15, wherein the first and second modules are identical, wherein each of the first and second modules comprises at least two sense inputs and at least two control outputs, wherein a sense input of the first module receives a voltage sensor signal for the first DC bus, wherein a first sense input of the second module receives a voltage sense signal for the second DC bus, and wherein a first control output of the second module transmits a control signal to the limiter circuit.

17. The method of claim 14, wherein the limiter circuit comprises a resistive braking circuit.

* * * * *